(12) United States Patent
Kemper (10) Patent No.: US 7,527,138 B1
(45) Date of Patent: May 5, 2009

(54) ROLL AWAY CHUTE WITH NO-TOOL LINERS AND GATES

(75) Inventor: H. Lyn Kemper, Honey Brook, PA (US)

(73) Assignee: Kemper Equipment, Inc., Honey Brook, PA (US)

( * ) Notice: Subject to any disclaimer, the term of this patent is extended or adjusted under 35 U.S.C. 154(b) by 542 days.

(21) Appl. No.: 11/356,648

(22) Filed: Feb. 17, 2006

(51) Int. Cl.
*B65G 11/16* (2006.01)

(52) U.S. Cl. ............... 193/33; 193/5; 193/3; 193/25 FT
(58) Field of Classification Search ............... 193/2 R, 193/3, 4, 14, 25 A, 25 FT, 2 D, 33; 198/860.1, 198/861.1
See application file for complete search history.

(56) References Cited

U.S. PATENT DOCUMENTS

| | | | |
|---|---|---|---|
| 3,524,666 A | 8/1970 | Schilf | 287/189.35 |
| 4,381,834 A | 5/1983 | Leinenger | 193/35 J |
| 4,529,660 A | 7/1985 | Heim | 428/423.1 |
| 5,244,069 A * | 9/1993 | Cosgrove | 193/5 |
| 5,735,377 A * | 4/1998 | Herren | 193/33 |
| 5,816,413 A | 10/1998 | Boccabella | 209/399 |
| 6,216,842 B1 | 4/2001 | Beale | 193/20 |
| 6,279,715 B1 | 8/2001 | Herren | 193/33 |
| 7,232,023 B2 * | 6/2007 | Ellis et al. | 193/2 R |

* cited by examiner

*Primary Examiner*—James R Bidwell
(74) *Attorney, Agent, or Firm*—Miller Law Group, PLLC (57) ABSTRACT

A modular wear panel system for a chute assembly associated with a vibratory screening apparatus is formed with a rigid backing member that has one or more mounting clips affixed thereto. The frame of the chute assembly is formed with transversely extending angle iron members and U-shaped channels that are arranged for engagement by the mounting clips for support thereof. The mounting panels are removable from the frame supports without requiring the use of tools to permit a single person to easily change or replace panel members. Blending gates can be formed in a chute floor by removing and reversing a panel member for positioning in opposition to the flow path of material along the chute floor. The panels are formed in common, interchangeable sizes to permit panels having little wear to be switched with other panels that are subjected to a large amount of wear.

23 Claims, 11 Drawing Sheets

ROLL AWAY CHUTE WITH NO-TOOL LINERS AND GATES

BACKGROUND OF THE INVENTION

The present invention relates generally to a screening apparatus for separating particulate materials, such as aggregate, and, more particularly, to a chute assembly for directing the discharge of the screening apparatus to desired locations.

A vibratory screen apparatus is utilized in many industries to separate particulate material into classifications according to size parameters. Conventional screening devices include a plurality of vertically spaced screen members that are in decreasing sizes so that material particles having size dimensions that will not permit the passage of the particles through the openings in the wire mesh screen are discharged off the end of the screen to be collected by associated collection devices and segregated appropriately. An example of a vibratory screen apparatus can be found in U.S. Pat. No. 5,816,413, issued to Joseph Boccabella on Oct. 6, 1998. In this Boccabella patent, the screen decking is formed as modular components that are mounted on a frame support by magnetic holding devices positioned by locator pins.

Delivery chutes are associated with the vibratory screen apparatus to receive the separated particle material from the individual screens and direct the flow of separated particulates to a desired location. An example of a delivery chute can be found in U.S. Pat. No. 6,279,715, granted on Aug. 28, 2001, to Harold Herren in which a top chute or deck delivers the particulate material discharged off the top screen to a conveyor for subsequent handling at a remote location, while a second chute or deck directs the discharge of particulate material off of a second screen member into a pile next to the vibratory screen. Presumably, the material passing through the second screen member is collected beneath the vibratory screen apparatus. In the Herron patent, the chutes are formed with a removable liner that is retained by a framework welded to the floor of the chute. The removable liner is formed in different sized modules that are preferably cut to size and numbered to prevent confusion in the installation of the panels.

Removable liners for chutes can also be found in U.S. Pat. No. 4,381,834, granted to John Leinenger on May 3, 1983, in which the elongated liner members are engaged with grooves formed into the floor of the chute to permit removal thereof. In U.S. Pat. No. 6,216,842, issued to Scott Beale on Apr. 17, 2001, in which a low friction liner is placed in a delivery chute to span across the floor of the chute. A modular wear pad for a delivery chute is taught in U.S. Pat. No. 5,735,377, granted on Apr. 7, 1998, to Harold Herren in which a threaded bolt is attached to a rubberized panel for allowing the panels to be mounted on a sub-structure by nuts detachably connected to the threaded bolt.

The formation of wear panels by attaching a wear resistant layer to a lower support substrate is taught in U.S. Pat. No. 4,529,660, issued on Jul. 16, 1985, to Robert Heim, although the disclosed liner is not in a modular format. The Heim liner utilizes a magnetic substrate to facilitate replacement of the liner when the material has been worn substantially, thus there is no mechanical connection between the liner and the frame supporting the liner defining the floor of the chute. U.S. Pat. No. 3,524,666, granted on Aug. 18, 1970, to Harold Schilf, discloses a floor clip that can be attached to a wooden deck member for engagement with an angle iron frame member beneath the flooring and providing support therefor.

Conventional roll away chutes have multiple decks to receive the discharge from corresponding screen members on vibratory screening apparatus. Such devices are formed with gates built into the floor of selected chutes to permit material flowing along one chute to be mixed or blended with the material corresponding to the chute immediately below the one chute. Conventional blending gates are hard to operate and are heavy and cumbersome to manipulate. Furthermore, the floor surface of the chutes and the blending gates forming a part of the floor surface are subject to heavy wear. For applications such as the separation of aggregates, or other hard particles, the wear liner must be replaced frequently. For conventional chute systems, replacement of the liner means that the entire liner defining the floor of the chute needs to be cut away from the support structure and a new liner welded into place. Such maintenance activity is extremely difficult and is complicated by the narrow passageways defined by the respective chutes. Other commercially available liner devices, such as the Herren liners disclosed in U.S. Pat. No. 5,735,377, still require access by the people replacing the liners to apply tools to the fasteners to effect removal of the liners.

Some modular liner devices, such as the Herren structure disclosed in U.S. Pat. No. 6,279,715, have very little commonality in the different panels installed on the floor of the chute. As a result, the wear surface panels are not interchangeable and require specific replacements to be stocked in order to quickly maintain and service the chute apparatus. Since the wear surface can be formed of different materials, such as rubber, urethane, chromium carbide and ceramics, each of which establish different performance characteristics, the decision to try a different wear surface on conventional chute designs requires a major investment in time and money.

It would be desirable to provide a wear surface system that would be more conducive to changing wear surface materials. It would also be desirable to provide a modular wear panel system that requires a minimum of replacement parts to be kept in stock, and would require little or no tools to effect a change in the panels. Such modular panels would preferably only require a minimal amount of time to replace a panel, or even the entire surface of a chute. Lastly, it would be desirable to provide a modular wear surface panel configuration that would be easy to convert blending gates from one selected position to another.

SUMMARY OF THE INVENTION

It is an object of this invention to provide a modular wear surface panel for use on a roll away chute apparatus that overcomes the aforementioned disadvantages of the prior art.

It is a feature of this invention that wear panel is relatively lightweight, as compared to conventional wear panel structures.

It is an advantage of this invention that the wear panels can be easily moved into position for mounting on the support frame.

It is another advantage of this invention that modular wear panel requires only a minimal support structure to attach a connection clip for mounting the panels to the frame support underlying the modular panels.

It is another feature of this invention that the modular wear panel is formed with a fixed mounting clip detachably engagable with underlying frame support members.

It is still another advantage of this invention that the modular wear panels can be removed and installed with no tools to connect and/or disconnect the wear panels from the underlying support structure.

It is still another advantage of this invention that the lightweight modular wear panels can be removed and installed quickly and easily in a short amount of time.

It is still another feature of this invention that blending gates can be formed in the floor on selected chutes by removing and reversing individual modular panels to be positioned contrary to the orientation of the modular panels forming the floor structure of the chute.

It is yet another advantage of this invention that the blending gates can be established in variably dimensioned openings, formed as a function of a multiple of the transverse width of the individual panels, to permit the blended mix of aggregates from two different levels to be varied as desired.

It is yet another feature of this invention that the individual wear panels are manufactured in common interchangeable sizes positioned along the floor of the chutes.

It is a further advantage of this invention that the worn panels typically found near the center of the chute floor can be switched with wear panels subjected to less wear away from the center of the chute floor since the individual wear panels are formed with common interchangeable dimensions.

It is still another feature of this invention that modular side panels for use along the generally vertical side members of the chutes can be provided with substantially the same manufactured configuration as the modular floor panels, so as to be easily removable in high wear applications.

It is still another advantage of this invention that the modular side panels can be bolted to the underlying support structure when replacement thereof is not as frequent as with the modular floor panels.

It is a further advantage of this invention that a single person can easily change, relocate or re-gate a chute in a minimal amount of time without requiring the use of tools to remove or attach the wear panels.

It is a further feature of this invention that the use of different materials as a wear surface for the chute can be accomplished with a minimum of effort.

It is still a further feature of this invention that the underlying frame structure for supporting the modular floor wear panels provides an overlap between successive rows of modular wear panels along the longitudinal length of the chute assembly.

It is still a further advantage of this invention that the cost of using a wear resistant liner for a chute assembly is lowered since the interchangeable modular panels permit wear to be spread across substantially all of the floor panels due to the switching of panels from one portion of the floor to another.

It is still another object of this invention to provide a modular wear panel system for a chute assembly, which is durable in construction, inexpensive of manufacture, carefree of maintenance, facile in assemblage, and simple and effective in use.

These and other objects, features and advantages are accomplished according to the instant invention by providing a modular wear panel system for a chute assembly associated with a vibratory screening apparatus in which the panel is formed with a rigid backing member that has mounting clips affixed thereto. The frame of the chute assembly is formed with transversely extending angle iron members and U-shaped channels that are arranged for engagement by the mounting clips for support thereof. The mounting panels are removable from the frame supports without requiring the use of tools to permit a single person to easily change or replace panel members. Blending gates can be formed in a chute floor by removing and reversing a panel member for positioning in opposition to the flow path of material along the chute floor. The panels are formed in common, interchangeable sizes to permit panels having little wear to be switched with other panels that are subjected to a large amount of wear.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
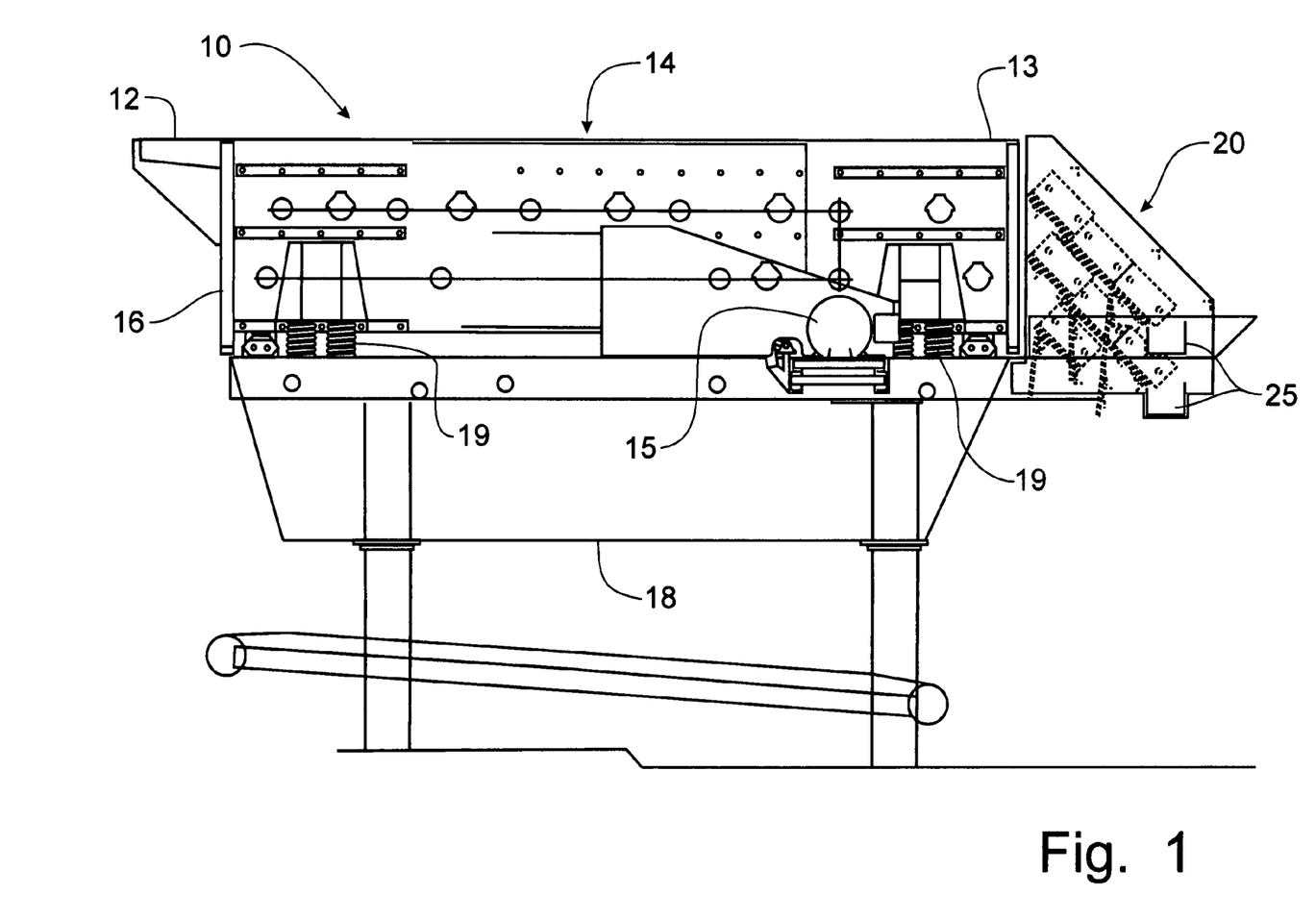
FIG. 1 is a side elevational view of a vibratory screening apparatus having a roll away chute incorporating the principles of the instant invention mounted at the discharge end of the segregating screen to receive the discharge therefrom.
Figure 2:
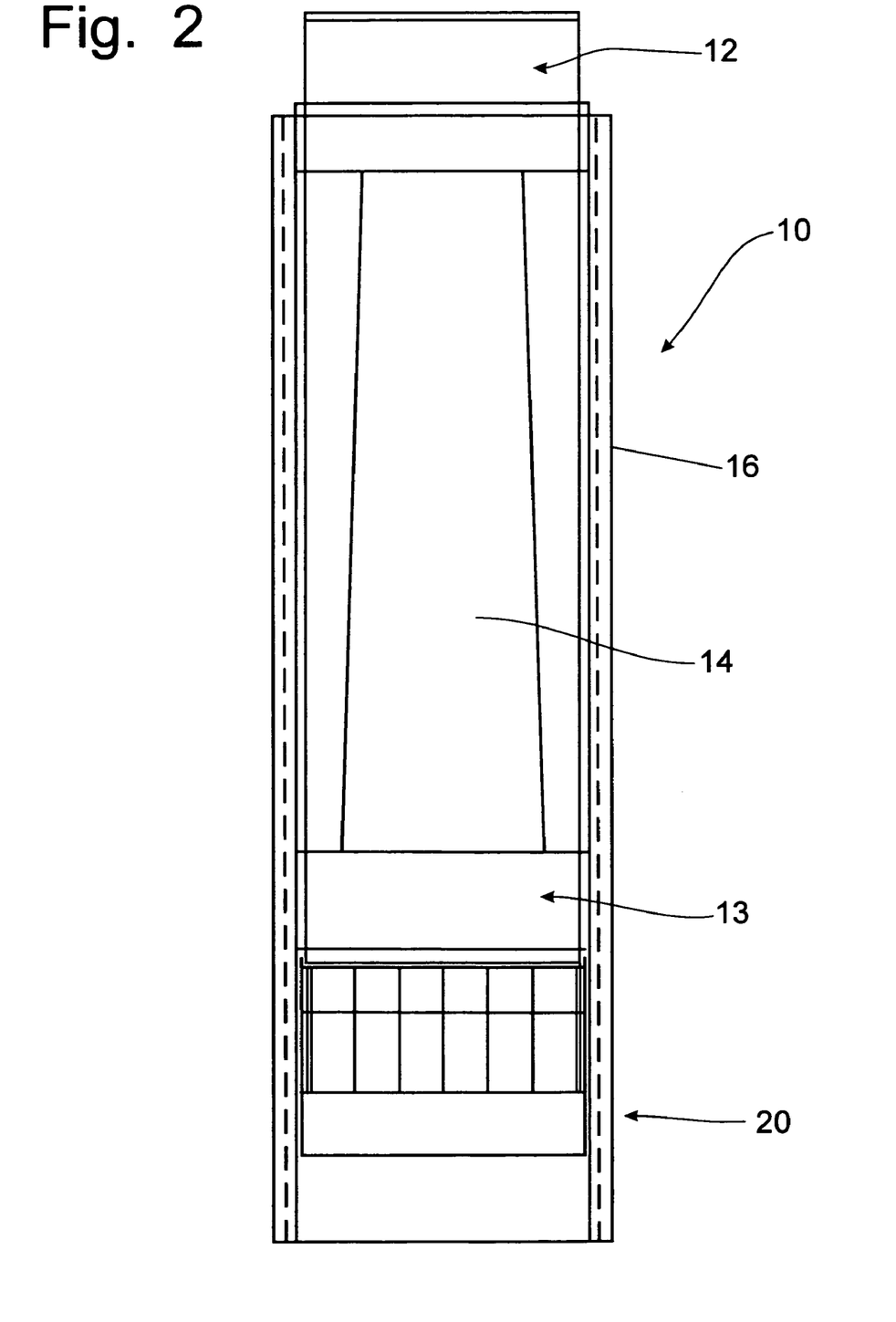
FIG. 2 is a top plan view of the vibratory screening apparatus and roll away chute assembly depicted in FIG. 1.
Figure 3:
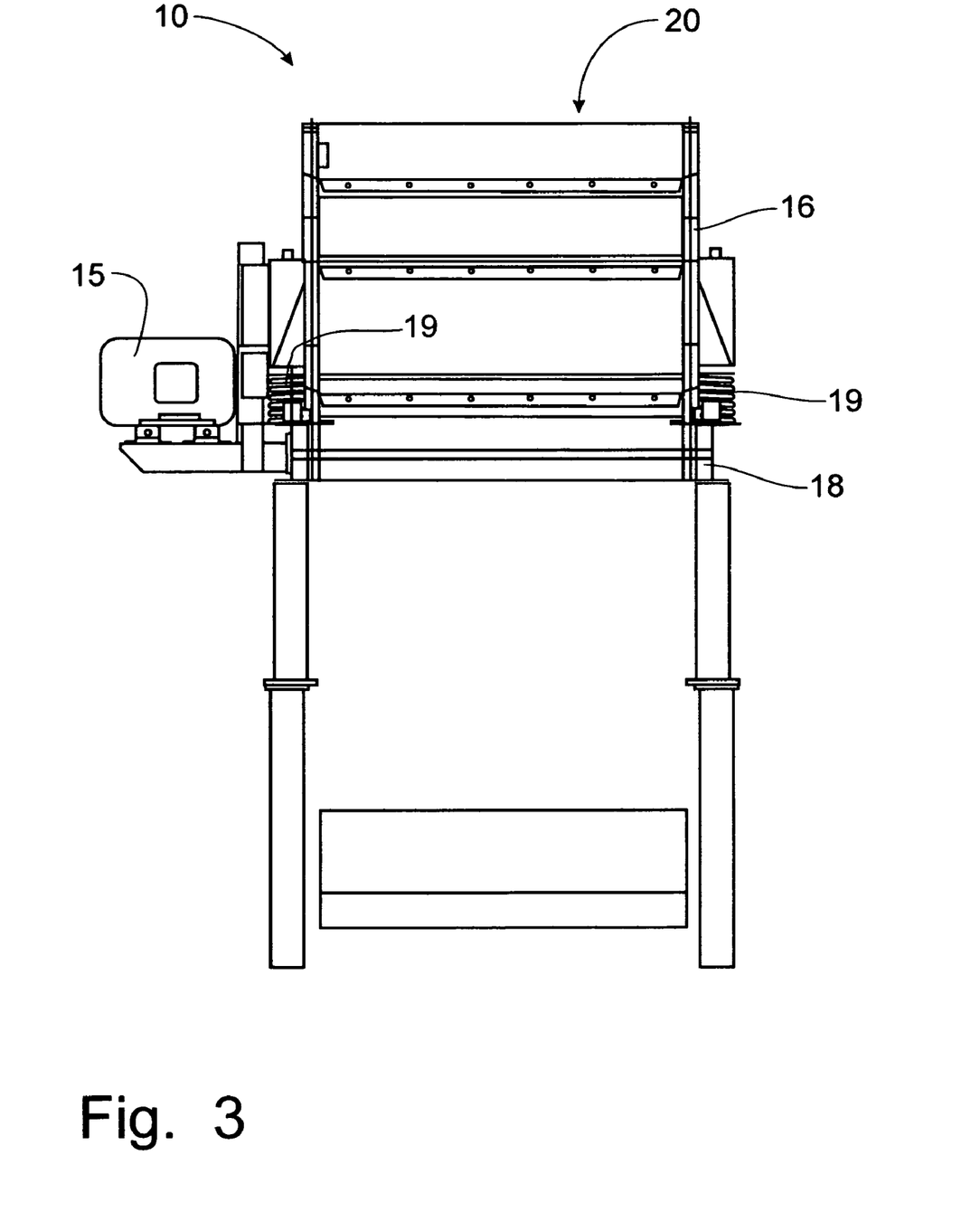
FIG. 3 is an end view of the roll away chute assembly depicted in FIGS. 1 and 2.

Referring now to FIGS. 1-3, a vibratory screening apparatus having a roll away chute assembly incorporating the principles of the instant invention mounted on the discharge end thereof can best be seen. The vibratory screening apparatus 10 is of a conventional design with an input area 12 allowing for the introduction of mass amounts of ungraded particulate material, such as stone aggregate, into the apparatus 10 for engagement with a set of vertically spaced screens 14. A motor 15, preferably electric, oscillates the screening apparatus 10 in a reciprocal manner to urge the particulate material to pass through the screen to a lower screen having smaller openings, or longitudinally along the screen to a discharge end 13. The screens 14 are mounted in an oscillatory frame 16 that is suspended on a base frame 18 by springs 19 to allow the reciprocating movement. The screens 14 are mounted in order of size with the largest opening screen being at the top and the smallest opening screen being at the bottom of the stack.

At the discharge end 13 of the vibratory screening apparatus 10, a chute apparatus 20 is typically mounted to receive the particulate materials being discharged off the discharge ends of the screens. The chute apparatus 20 is configured with a plurality of chute decks 21-23 to direct the segregated particulates into desired locations usually remote from the screening apparatus 10. Generally, one chute deck is associated with a corresponding screen so that the material discharged therefrom can be handled and transported accordingly. In applications, such as stone aggregate, where the material being handled is very abrasive as the material passes over a chute deck, the chute apparatus 20 is usually provided with a removable liner so that the support structure of the chute deck is not abraded. This liner needs to be replaced as the abrasive wear destroys the liner structure.

Figure 4:
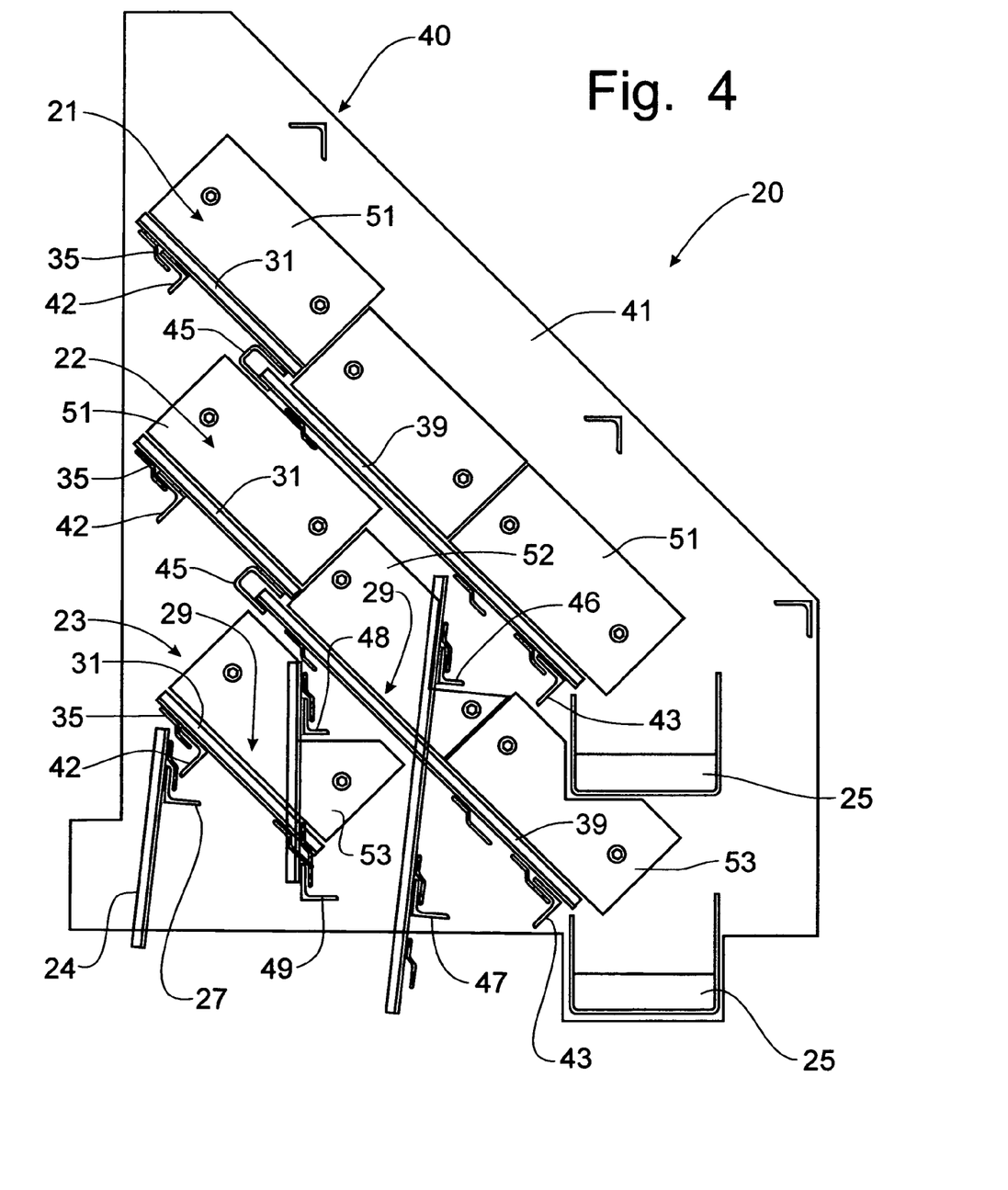
FIG. 4 is a side elevational view of the roll away chute assembly with the outer support structure being removed for the purpose of viewing the modular panel members forming the chutes, blending gates being formed in the second and third chutes.

As best seen in FIGS. 4-7, the chute apparatus 20, typically referred to as a roll away chute because the chute apparatus 20 is detachable from the screening apparatus 10, can be configured with a top deck 21, a middle deck 22 and a bottom deck 23, which correspond to the discharge ends of respective screens 14 in the screening apparatus 10. The screening apparatus 10 having a three deck chute apparatus 20, as depicted in the drawings, can have a fourth screen that discharges against a barrier 24 that keeps the discharge of the fourth screen separate from the material discharged onto the third deck 23, while the material passing through the fourth screen can be collected by the conveyor 11 below the screening apparatus 10. Typically conveyors collect the particulate material discharged from the respective chutes. Examples of such conveyors are shown in FIG. 4 at the end of the first and second decks 21, 22.

Sometimes the operators of such a screening apparatus 10 wish to make a mixture of particulate material corresponding to two different decks, thus creating a mixed product. To accomplish this mixing of product from one deck to another, the floors of the decks are conventionally provided with blending gates that allow the material from one chute to fall onto a lower chute. Such mixed product must also be kept separate from the segregated products corresponding to the individual chute decks.

Referring now to FIGS. 4-10B, the liner for the chute decks 21-23 is preferably in the form of modular panels 30 that are formed in a limited number of sizes to enhance interchangeability between the panels 30. The panels 30 are formed with a liner material 32, which can be a resilient material such as rubber or urethane, or a durable material such as chromium carbide or ceramic, mounted onto a steel backing 33. For some durable liner materials, such as standard steel or AR plate, the backing plate 33 is redundant and is not needed. One skilled in the art will readily understand that any references hereinafter to the backing plate 33 will also include configurations of the panels 30 in which the liner material is of a nature that the backing plate 33 is redundant.

One or more clips 35 are welded to the backing plate 33, or directly to the back of the steel liner material in such configurations, to permit the mounting of the panels 30 on frame members 40, as will be discussed in greater detail below. The clips 35 are preferably strips of steel that are bent in the middle to provide a base portion 36 that is affixed, such as by welding, to the backing plate 33, and an elevated portion 37 that is oriented generally parallel to the base portion 36, but due to the bent transition portion 38 is spaced above the backing plate 33 to permit engagement with frame members 40.

Figure 10A:
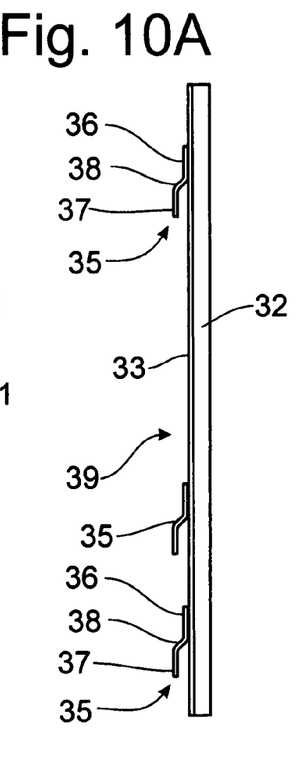
FIG. 10A is an end view of a floor wear panel positioned at the discharge end of the top and middle chutes.
Figure 10B:
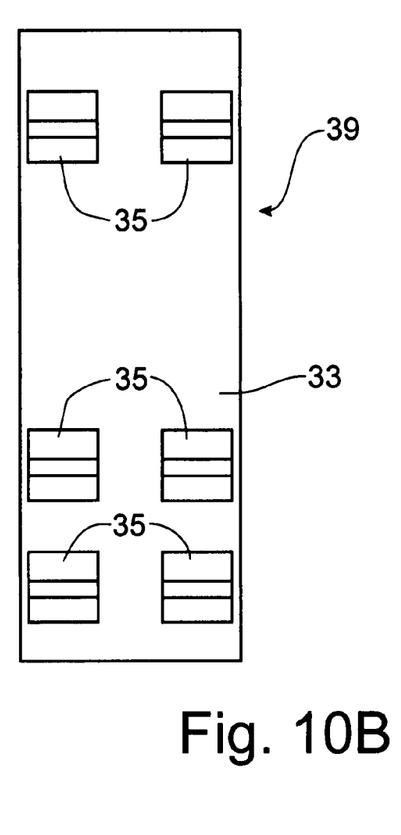
FIG. 10B is a plan view of the back side of the floor wear panel depicted in FIG. 10A.

As is best seen in FIGS. 8A-10B, the panels 30 can be formed in different lengths, depending on the specific installation and the dimensions of the frame. In the way of an example, a first panel embodiment 31 in FIGS. 8A-9B could have a length of approximately 18 inches and would be formed in two widths of approximately 7 and 9 inches. As best seen in FIGS. 4-7, such first panels 31 are sized to conform to the longitudinal length of the shortest chute deck 23 and serve as the lead-in portion of the top and middle decks 21, 22. The narrower of the first panels 31 are positioned at the side edges of the decks 21-23 to complete the transverse span of a conventional width deck, while the wider of the first panels 31 are mounted side by side across the transverse span of each of the decks 21-23 between the side pieces. The width of these wider middle panels 31 is selected so that the seams between the panels 35 would not align with the seams of the subsequent panels 39. As best seen in FIGS. 10A and 10B, a second embodiment of the panels 39 could have a length of approximately 36 inches and a width of approximately 13 inches. The width of the second embodiment of panels 39 in the disclosed configuration is selected to span the transverse width of the deck 21, 22 in a discrete number of panels.

The first panel embodiment 31 is formed with a single clip 35 for use on the top and middle decks 21, 22 and with top and bottom clips 35 for use on the bottom deck 23, as will be described in greater detail below. The second panel embodiment 39 is formed with three double sets of clips 35 for stabilized support in mounting on the frame members 40 as a deck floor and in mounting as a blending gate, as will also be described in greater detail below. The second panel 39 is provided with double sets of clips to provide better stability due to the larger width than on the first panels 31. One skilled in the art will recognize, however, that the first panels 31 could also be formed with double sets of clips 35, although the transverse width of the individual clips 35 would likely have to be smaller than shown in FIGS. 8B and 9B.

The frame 40 is formed of transversely spaced, vertically oriented side sheets 41 and a plurality of subframe members spanning transversely between the side sheets 41. Most of the subframe members are formed as angle irons that are positioned and oriented for appropriate engagement by the mounting clips 35 from the modular panels 31, 39. The remaining subframe members 45 are formed as C-shaped channels, or alternatively could be formed as angles or other shapes, that are positioned and oriented to receive and support an end of the larger panels 39 on top of the support subframe members 45.

To support the top deck 21, as is best seen in FIGS. 4-7, a front angle iron 42 is positioned adjacent the receiving end of the chute apparatus 20 to be engaged by the single clip on the short modular panel 31 such that the end of the panel 31 is in receiving relationship with the top screen 14 of the screening apparatus 10. The downstream end of the panel 31 is rested on top of support subframe member, such as the C-channel 45.

The long panel 39 is then positioned within the support subframe member 45 for support of the one end thereof and then engaged with a rear angle iron 43 by the lowermost set of mounting clips 35. The angle irons 42, 43 are oriented with the one leg thereof parallel to the angled orientation intended for the decks 21-23, which as is depicted in FIG. 4 is at approximately 45 degrees. The downstream end of the long panel 39 is positioned above and adjacent to the conveyor 25 into which the particulate material received from the top screen 14 is discharged. The positions of the two panels 31, 39 is arranged in an overlapping relationship with the downstream end of the short panel 31 being rested above the upstream end of the long panel 39, both of which being supported by the support subframe member 45.

The middle deck 22 is formed substantially identically as the top deck 21 with the short panel 31 engaged with a front angle iron 42 and the downstream end rested on top of another support subframe member 45. The long panel 39 is received on the support subframe member 45 and engaged by the bottommost mounting clips 35 with a rear angle iron 43. Corresponding to the middle deck 22, a third and fourth angle iron supports 46, 47 are mounted between the transversely spaced side sheets 41 with the upper support 46 being located above the plane of the middle deck 22 and the lower support 47 being below the plane of the middle deck 22. The upper and lower supports 46, 47 are generally vertically aligned and are spaced apart the same distance as the two of the sets of mounting clips 35 on the long panel 39.

Figure 4A:
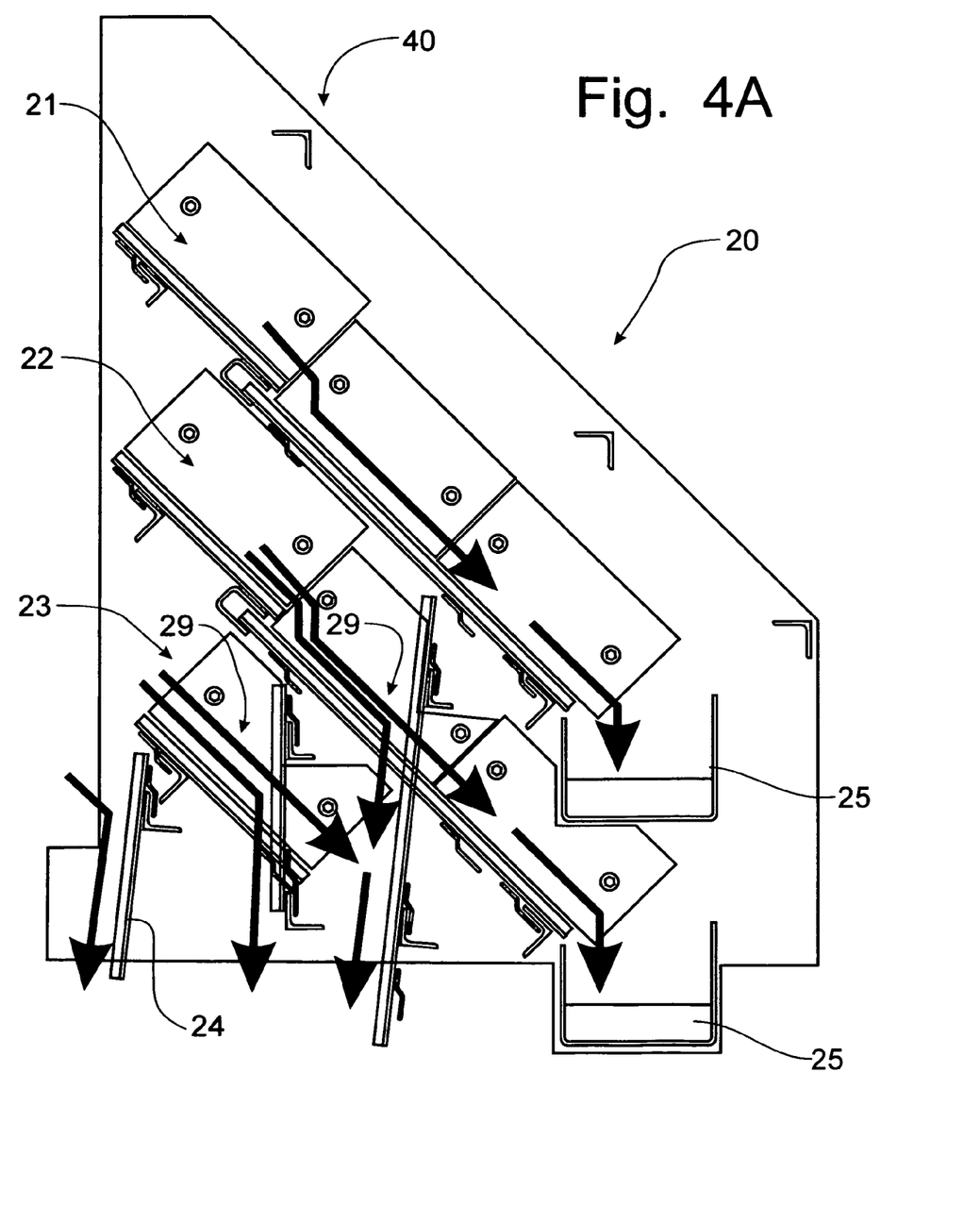
FIG. 4A is a side elevational view similar to that of FIG. 4 but having flow pattern lines superimposed thereon to indicate flow paths of particulate material over the chutes.
Figure 5:
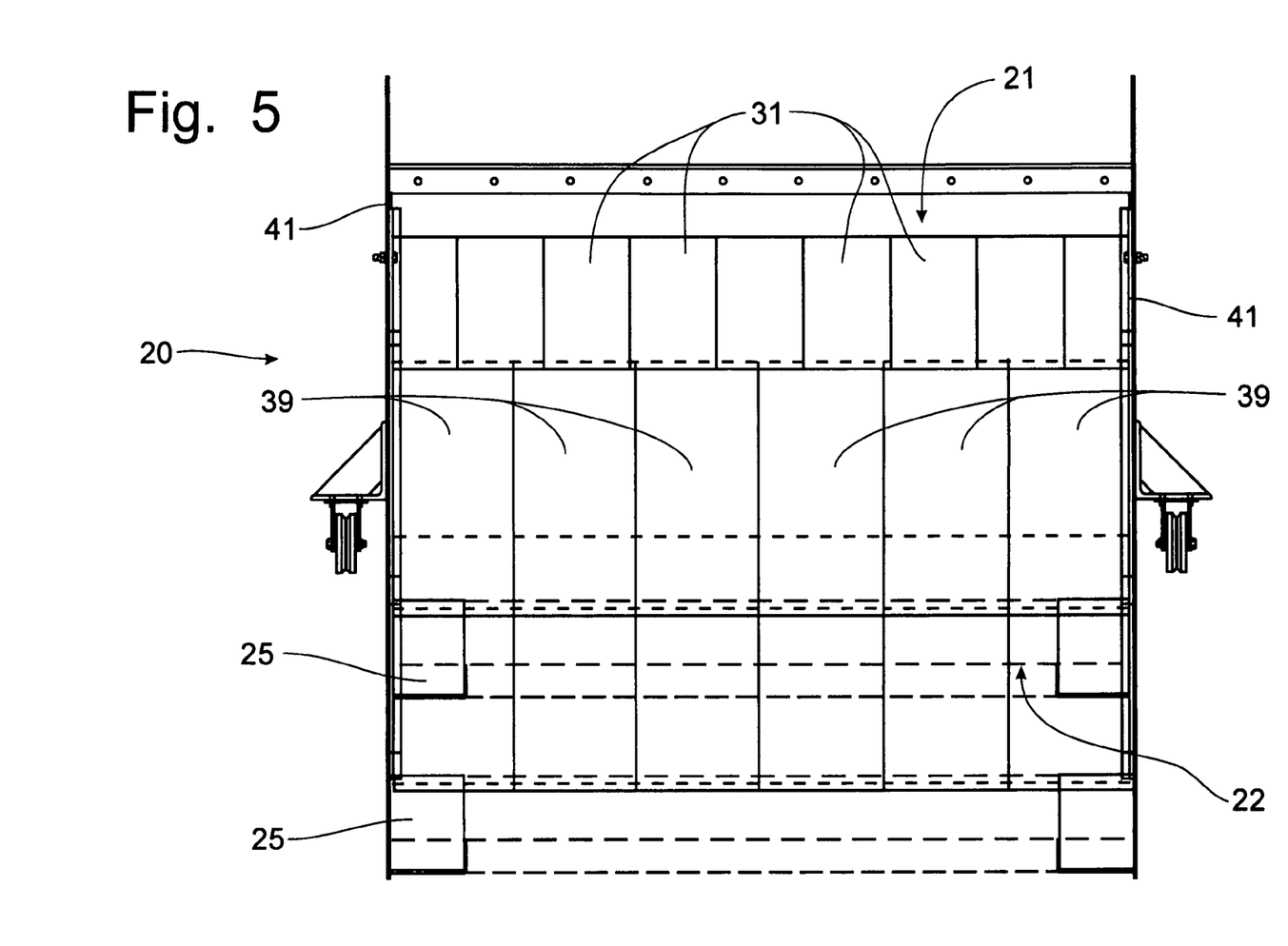
FIG. 5 is an end elevational view of the chute assembly depicted in FIG. 4.
Figure 6:
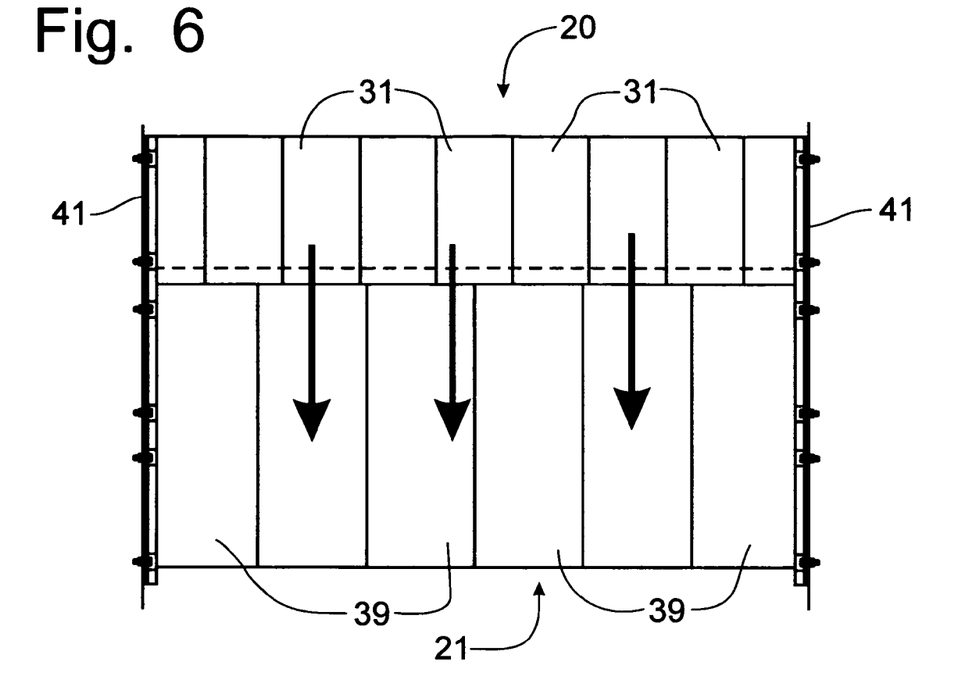
FIG. 6 is a schematic flow pattern diagram depicting the top chute corresponding to lines 6-6 of FIG. 4.
Figure 7:
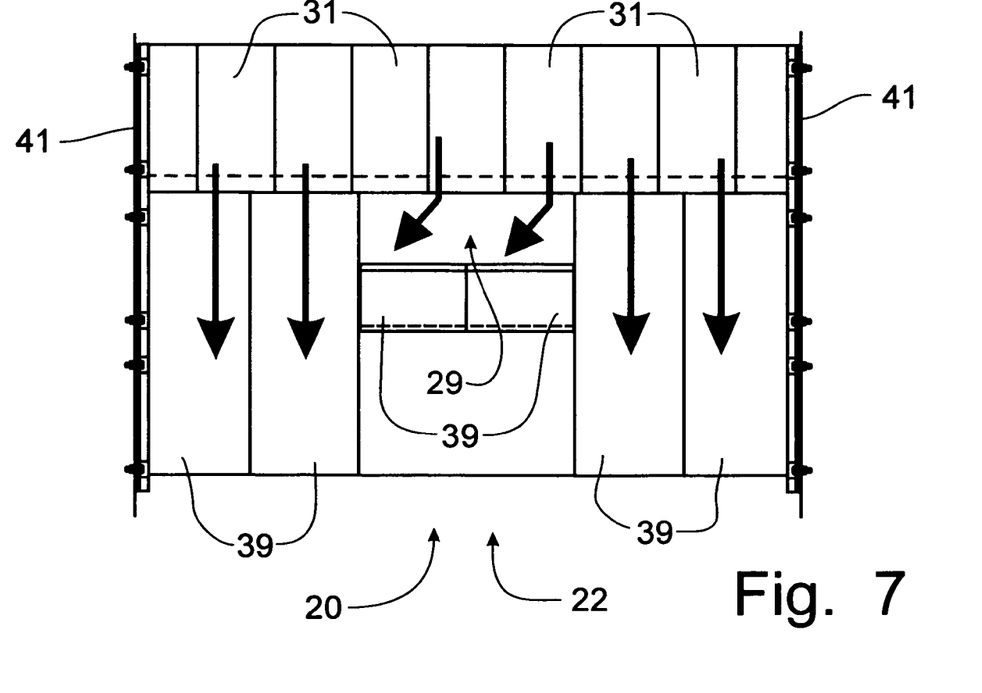
FIG. 7 is a schematic flow pattern diagram depicting the middle chute corresponding to lines 7-7 of FIG. 4.
Figure 8A:
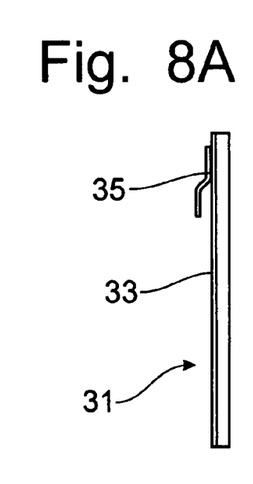
FIG. 8A is an end view of a floor wear panel positioned at the receiving end of the top and middle chutes.
Figure 8B:
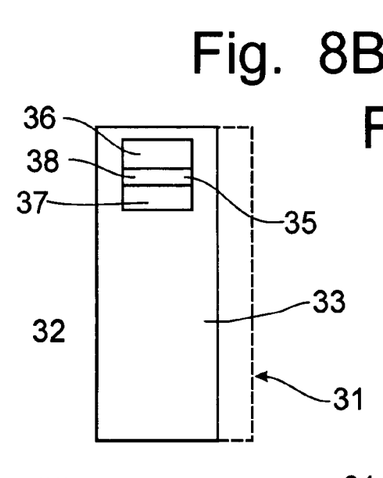
FIG. 8B is a plan view of the back side of the floor wear panel depicted in FIG. 8A, the optional width of the panel being depicted in broken lines.
Figure 9A:
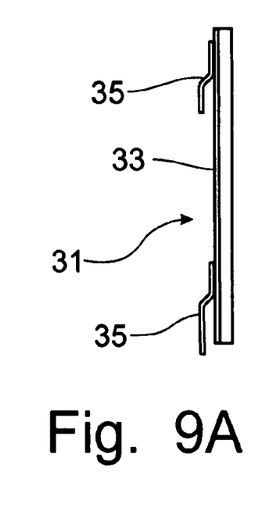
FIG. 9A is an end view of a floor wear panel positioned at the receiving end of the bottom chute.
Figure 9B:
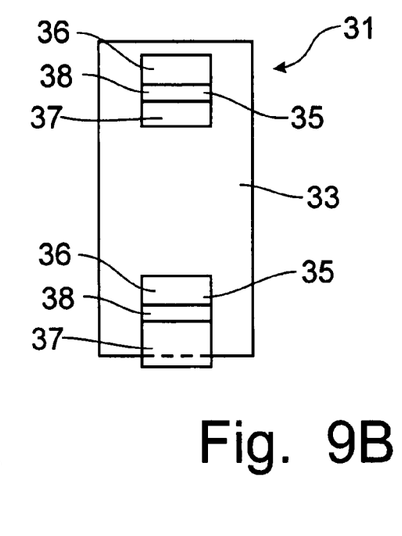
FIG. 9B is a plan view of the back side of the floor wear panel depicted in FIG. 9A.

Thus, by disengaging selected ones of the panels 39 from the middle deck 22 by disengaging the lowermost mounting clips 35 from the rear angle support 43 and then sliding the upstream end off of the support sub frame member 45, the selected long panels 39 can be reversed and mounted by the first two sets of mounting clips 35 on the angle supports 46, 47 such that the resilient surface is facing upstream for engagement with the incoming flow of particulate material. This reorientation of the selected long panels 39 opens a hole 29 through which some of the flow of the particulate material can pass to fall to the lower deck 23. The number of long panels 39 on the second deck 22 to be reversed to provide a blending gate will depend on the "recipe" of the blended material. The more long panels 39 that are reversed, the more of the flow of the particulate material that will drop into the flow of the lower chute 23. If, as an example, two or three of the long panels 39 on the second deck 22 are reversed, some of the particulate flow on the middle deck 22 will fall to the lower deck 23, as is represented in FIG. 4A, while the remaining flow of particulate material will pass into the corresponding conveyor 25.

The lower deck 23 is formed with only the short panels 31, although two mounting clips 35 are preferable for proper support of the panel 31. As with the top and middle decks 21, 22, the top mounting clip 35 on the panel 31 is engaged with a front angle support 42, though the mounting clip 35 on the downstream end of the panel 31 is rested on top of a support angle 49 that is used as a support to form a blending gate. Similar to that described above with respect to the middle gate 22, the lower deck has a pair of support angles 48, 49 for the support of selected ones of the short panels 31 that are reversed and hung by the two mounting clips 35 contrary to the flow of particulate material flowing on the lower deck 23.

The reversing of selected ones of the short panels 31 on the lower deck 23 opens a hole 29 in the floor of the lower deck 23 to permit the passage of particulate material through the hole below the lower deck 23, while the remainder of the flow of the particulate material on the third deck 23 passes the interfering reversed panels 31 and flows along the normal path. This can be particularly advantageous in controlling the proportions of the particulate material from the third deck to be blended with the particulate material from the middle deck passing through the opening 29 formed by the reversing of the long panels 39. The remaining flow of particulate material dropping through the opening 29 in the lower deck 23 would remain unblended and could be collected independently off the other discharges of the chute apparatus 20.

Side panels 51-53 are formed in substantially the same configuration as the floor panels 31, 39 with a wear surface or liner material 32 affixed to a backing plate 33, except in configurations where the backing plate 33 would be redundant. The side panels 51-53 can be formed with mounting clips, as described above with respect to the floor panels 31, 39. Instead of mounting clips 35 being welded to the backing plate 33, the side panels 51-53 can also be formed with bolt holes to permit them to be bolted to the side sheets 41 in applications where the side panels do not require replacement frequently, and because the fasteners are easily accessed once the floor panels 31, 39 have been removed from the underlying supports. The easily removable side panels 51-53 are preferably utilized where frequent replacement is desired due to the wear conditions imposed by the specific application.

Figure 11A:
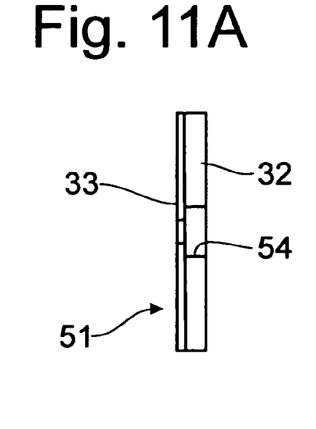
FIG. 11A is an end view of a first embodiment of a side panel.
Figure 11B:
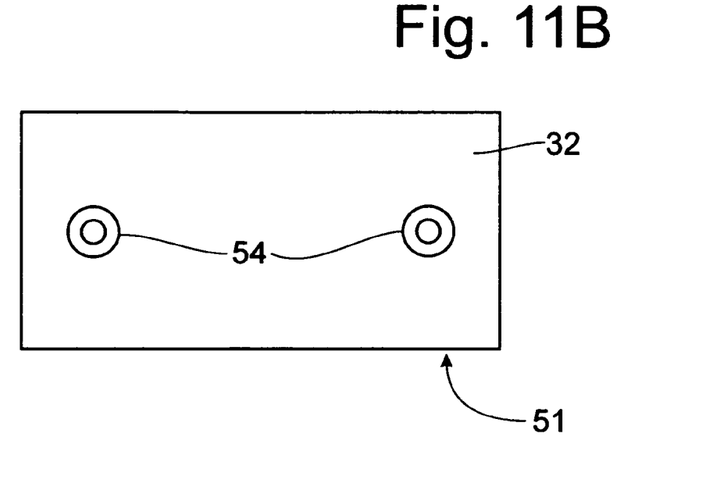
FIG. 11B is a plan view of the side panel depicted in FIG. 11A.
Figure 12A:
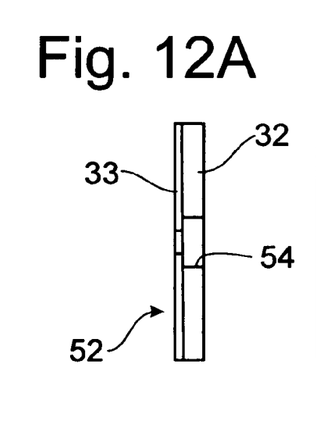
FIG. 12A is an end view of a second embodiment of a side panel.
Figure 12B:
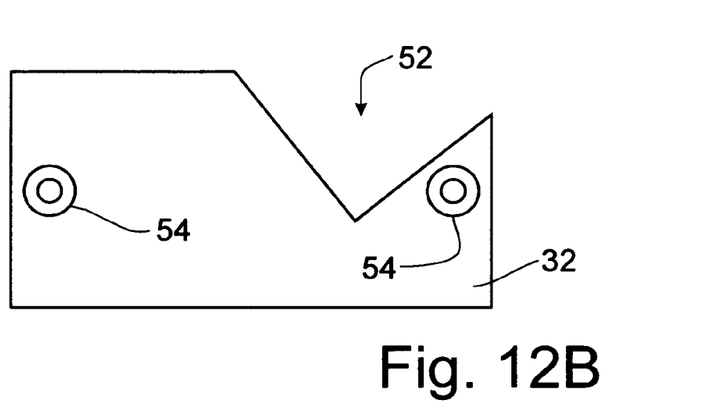
FIG. 12B is a plan view of the side panel depicted in FIG. 12A.
Figure 13A:
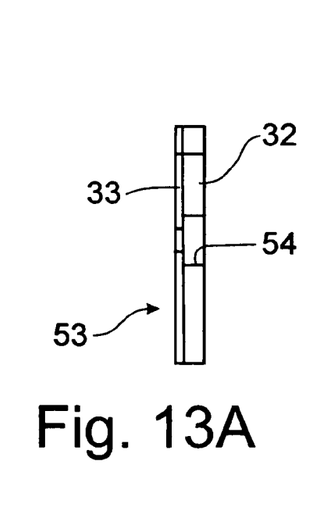
FIG. 13A is an end view of a third embodiment of a side panel.
Figure 13B:
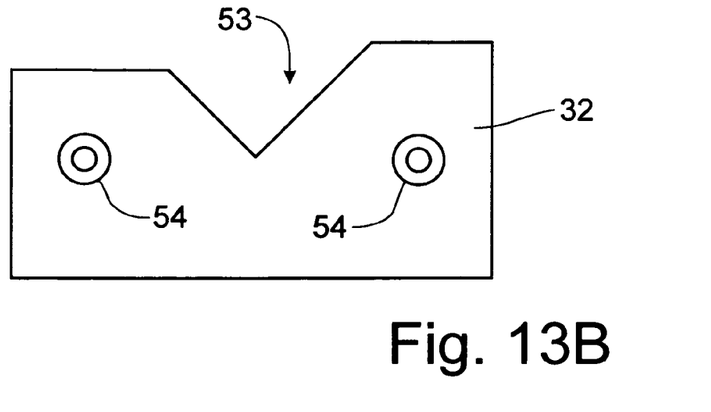
FIG. 13B is a plan view of the side panel depicted in FIG. 13A.

The side panels 51-53 are formed in a configuration that corresponds to the position of the side panel relative to the frame supports 46-48. In FIGS. 11A and 11B, the side panel 51 is rectangular in shape with a pair of openings formed along the central axis thereof for the passage of bolts to engage the side sheets 41. The side panels 51 are rectangular as they are positioned at the receiving end of the chute assembly 20 for each of the top and middle decks 21, 22, and along the entire top deck 21 as there are no support members to be avoided. The side panel 52 in FIGS. 12A and 12B have a notch removed from the downstream end thereof so as to avoid the angle support 46 positioned above the middle deck 22. Similarly, the side panel 53 depicted in FIGS. 13A and 13B has a notch taken out of the middle to avoid the upper angle support 48 for the lower deck 23 and the conveyor 25 for the top deck 21. The positions of the side panels 51-53 are best seen in FIG. 4.

Figure 14:
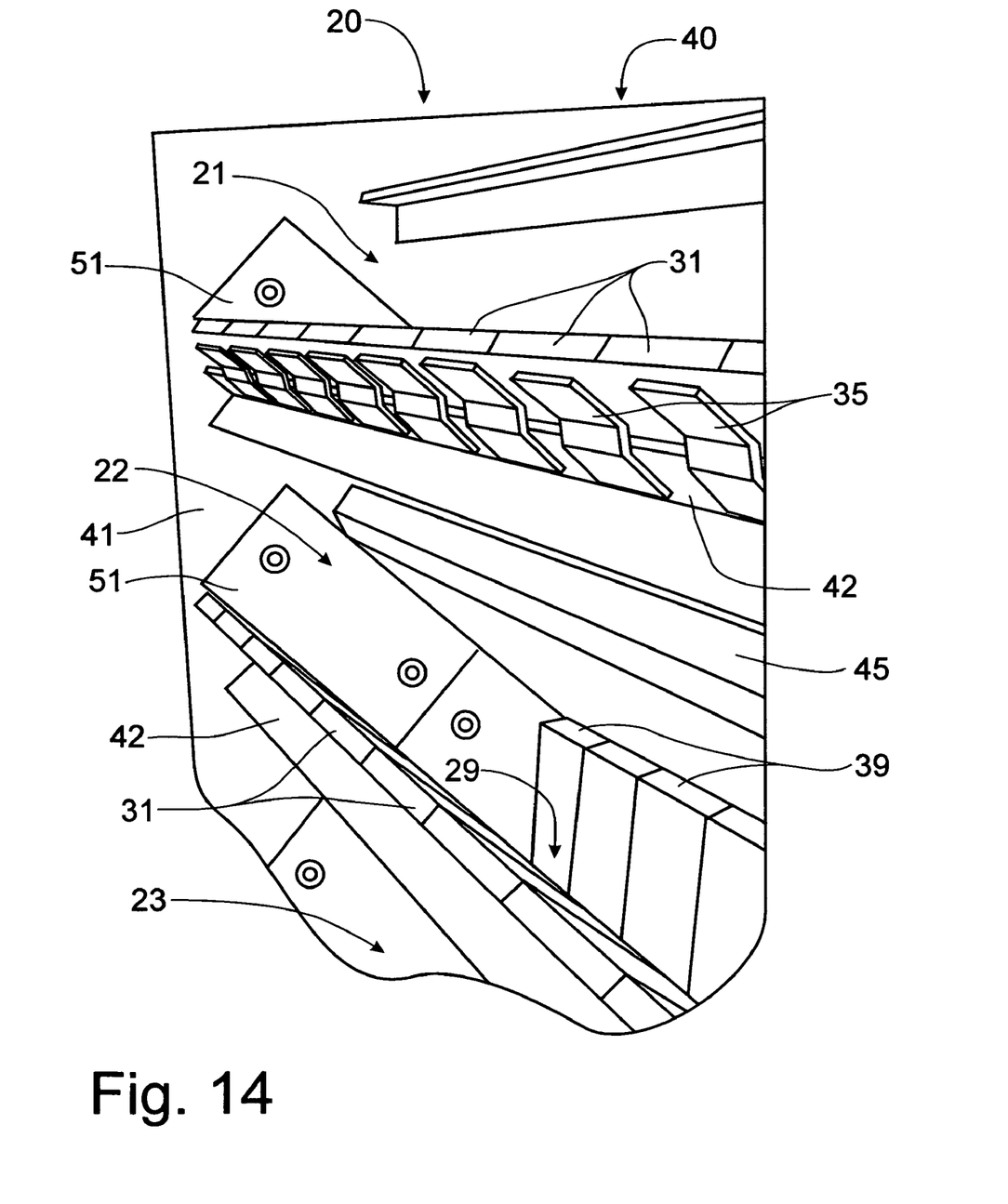
FIG. 14 is a partial perspective view of the top and middle chutes with several of the floor panels of the middle chute being positioned to form a blending gate.
Figure 15:
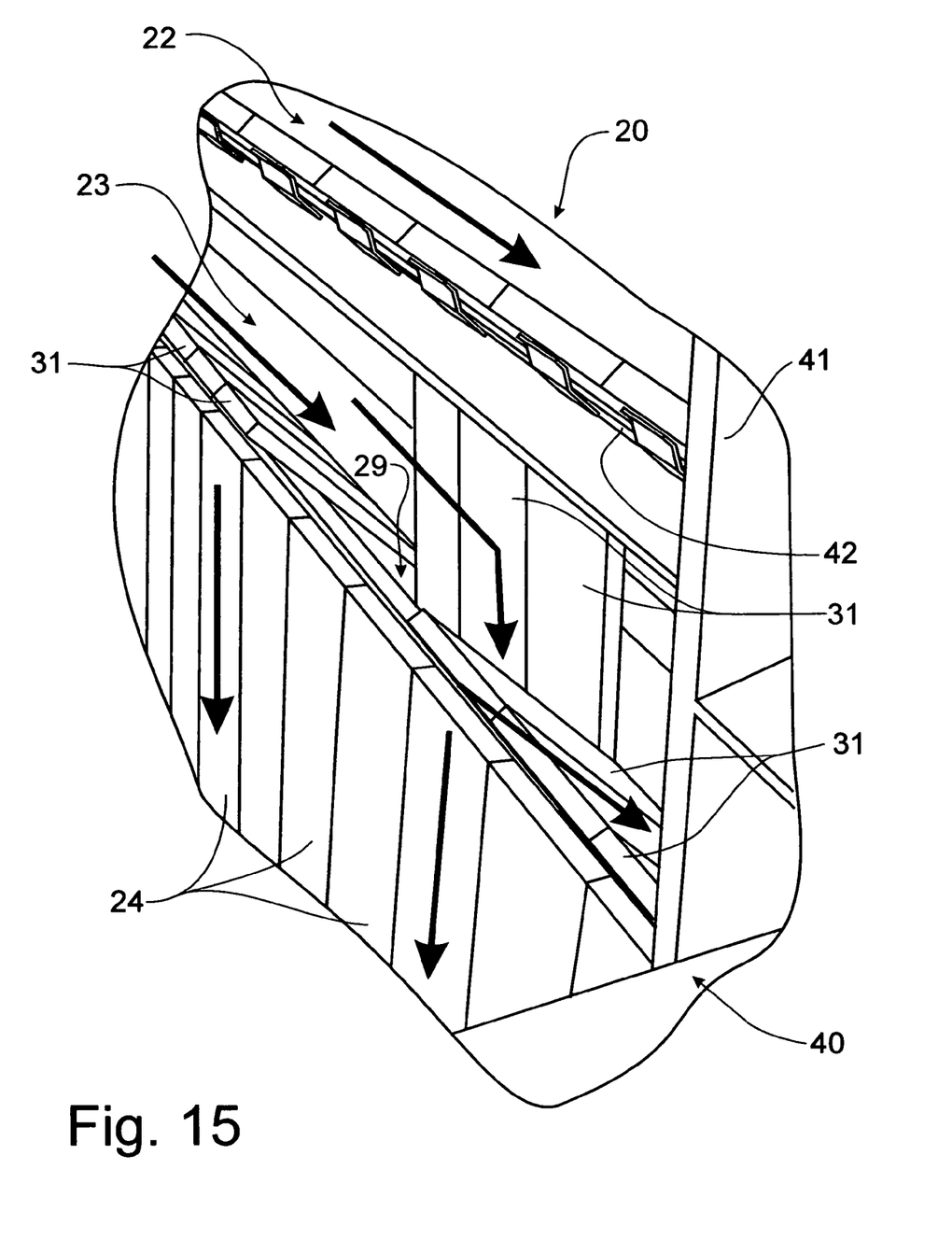
FIG. 15 is a schematic perspective view of the middle and bottom chutes to reflect flow patterns for the particulate material being received in these chutes.

The relative orientation of the panels for the top and middle decks 21, 22 with a couple of the long panels 39 being reversed to open a blending gate in the middle deck 22 can be seen in FIG. 14. Similarly, the schematic view of FIG. 15 depicts the flow path or particulate material flowing on the middle and lower decks 22, 23, with several of the short panels 31 being reversed to open a blending gate in the lower deck 23. The flow path of material discharged off of a fourth screen is reflected off the barrier panels 24 that are mounted on a corresponding support 27 positioned adjacent and below the front angle iron support 42 for the lower deck 23.

In operation, the side panels 51-53 are bolted to the side sheets 41, or clipped to frame members (not shown), and the floor panels 31, 39 are mounted on the frame supports 42, 43 and 45 as described above to receive the flow of particulate material from the corresponding screens on the screening apparatus 10. The flow of particulate material abrades the liner material 32 in patterns that reflect the flow rates of the particulate material over the respective decks 21-23. Accordingly, the center portions of the respective decks 21-23 are normally subjected to more wear than the side portions of the same deck. Similarly, certain decks will be subjected to more wear than other of the decks due to the characteristics of the particulate material being graded. For example, if the material being screened by the screening apparatus 10 has a majority of the material that will not pass through the second screen, but does pass through the first screen, a large amount of material will be flowing over the middle deck 22 with much lesser amounts flowing over the other two decks 21, 23. As a result, the panels 31, 39 on the middle deck 22 will have greater wear characteristics than the panels 31, 39 on the other decks 21, 23, with most of the wear being sustained by the panels 31, 39 in the center of the deck 22.

When uneven wear is found in the chute apparatus 20, maintenance can extend the life of the chute apparatus 20 by switching the panels 31, 39 with correspondingly sized panels 31, 39 that are not subjected to much wear. In the examples given above, it would be possible to switch the short panels 31 of the lower deck 23 with the short panels 31 of the middle deck 22. Panels that were off center on one deck can be placed in the central part of that deck or on another deck. As long as the sizes of the panels 31, 39 correspond with one another, the panels can be switched.

The switching of the panels 31, 39 can be accomplished without requiring the use of tools. The panel 31, 39 can be removed simply by pulling on the panel along the axis of the corresponding deck toward the screening apparatus 10 so that the mounting clips 35 become disengaged from the angle supports 42, 43. The long panels 39 will also require a slight opposing motion to free the upstream end from the support subframe members 45 before the long panels can be extracted from the corresponding deck. Since the panels 31, 39 are relatively light, weighing in the range of 10 to 30 pounds for panels having a resilient liner material 32, or up to 50 pounds for the panels with the durable liner material, one person can service the chute assembly 20 effecting the replacement or switching of the worn panels. Since the panels are formed in only a couple of standard sizes, the operator need only have a small inventory of replacement panels on stock for normal service and maintenance.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A chute apparatus for use with a particulate classification device, said chute apparatus having a plurality of decks directing a flow of particulate material of a common classification to a remote location, comprising:
a frame including transversely extending support frame members including floor support members and gate support members; and
a plurality of modular floor panels supported on said floor support members to define said decks, each said modular floor panel being formed with a liner material affixed to a rigid backing plate and at least one mounting clip affixed to said backing plate for detachable engagement with a corresponding floor support member, said floor panels being mounted on said floor support members in a transverse array to define said decks.

2. The chute apparatus of claim 1 wherein selected ones of said floor panels have at least two mounting clips affixed to said backing plate in a longitudinally spaced relationship, said mounting clips being spaced to correspond to a respective pair of gate support members such that said selected ones of said floor panels can be selectively removed from said floor support members and mounted on respective gate support members to become gate panels defining an opening in said deck with said gate members positioned contrary to said floor panels to direct particulate material through said opening.

3. The chute apparatus of claim 2 wherein other selected ones of said floor panels are formed with at least three longitudinally spaced mounting clips affixed to said backing plate, two of said mounting clips being spaced corresponding to a generally vertical dimension between a corresponding pair of gate support members while the third said mounting clip is utilized when engaging a floor support member.

4. The chute apparatus of claim 2 wherein some of said floor panels are short floor panels having a first length while others of said floor panels are long floor panels having a second length longer than said first length, at least one of said decks being formed with a first transverse row of said short floor panels and a second transverse row of said long floor panels.

5. The chute apparatus of claim 4 wherein said first row of short floor panels overlaps said second row of long floor panels.

6. The chute apparatus of claim 5 wherein said gate support members are angle irons having a leg thereof oriented for engagement of said mounting clips.

7. The chute apparatus of claim 6 wherein said floor support members include a front floor support member for each respective deck formed as an angle iron with a leg thereof oriented parallel to said respective deck for engagement with said mounting clips, at least one of said decks also including a rear floor support member formed as an angle iron with a leg thereof oriented parallel to said deck for engagement with said mounting clips.

8. The chute apparatus of claim 7 wherein said floor support members further include a support subframe member positioned between said front and rear floor support members at said overlap between said first and second transverse rows of floor panels to support a downstream end of said first transverse row of floor panels on top of said support subframe member and supports an upstream end of said second transverse row of floor panels below said downstream end of said first transverse row of floor panels to provide said overlap between said first and second transverse rows of floor panels.

9. The chute apparatus of claim 8 wherein each said support subframe member is formed as a C-channel.

10. The chute apparatus of claim 8 further comprising three decks, including a top deck, a middle deck and a lower deck, said top deck and said middle deck being formed from said first and second transverse rows of short and long floor panels, said lower deck being formed with only a single row of floor panels, said middle and lower decks having respective gate support members to permit selected ones of said floor panels to be removed and converted into said gate panels.

11. The chute apparatus of claim 10 wherein each said transverse row of floor panels terminates at opposing side panels formed with a layer of liner material affixed to a backing plate, each said side panel being oriented generally perpendicularly to said transverse row of floor members and being detachably mounted on said chute apparatus.

12. A modular floor panel for use in forming decks of a chute apparatus directing flows of segregated particulate material from a classification device to a remote location, said chute apparatus including transversely extending frame members, comprising:
a layer of liner material defining a wear surface over which particulate material passes; and
at least one mounting clip supporting said layer of lining material for detachable engagement with a transverse frame member of said chute apparatus, said mounting clip having a base portion adjacent said layer of liner material and an elevated portion spaced from and oriented generally parallel to said layer of liner material to permit said panel to be clipped onto said transversely extending frame members without requiring tools.

13. The modular floor panel of claim 12 wherein said at least one mounting clip is affixed directly to said layer of liner material.

14. The modular floor panel of claim 12 further comprising a rigid backing plate having first and second opposing sides, said layer of lining material being affixed to said first side of said backing plate and said at least one mounting clip being affixed to said second side of said backing plate.

15. The modular floor panel of claim 12 wherein said mounting clip further includes a transition portion interconnecting said base portion and said elevated portion.

16. The modular floor panel of claim 12 wherein a plurality of said floor panels are mounted on said frame member to define a transverse row of said floor panels, at least one of said decks being formed by first and second transverse rows of said floor panels.

17. The modular floor panel of claim 16 wherein said first transverse row of floor panels is formed from short floor panels having a first length, said second transverse row being formed of long floor panels having a second length greater than said first length, said first transverse row of floor panels overlapping said second transverse row of floor panels.

18. A method of forming a chute assembly having decks cooperable with a particulate material classification apparatus to direct the flows of segregated particulate material discharged from said classification apparatus to remote locations, comprising the steps of:
forming a frame for said chute assembly having a front transverse floor support member and a second transverse floor support member corresponding to each said deck, at least an uppermost one of said decks having a third transverse floor support member, at least one of said decks further having a pair of transverse gate support members spaced generally vertically;
providing a plurality of modular floor panels having a layer of liner material defining a wear surface over which particulate material passes, and a mounting clip supporting said layer of lining material for detachable engagement with a transverse frame member of said chute assembly;
mounting said floor panels on said front floor support member with said mounting clip detachably retaining said floor panel on said front floor support member to form a transverse row of floor panels on each of said decks, each said floor panel being positioned with a downstream end engaged with said second floor support member; and
placing a second transverse row of floor panels on at least said uppermost one of said decks by engaging said mounting clip with said third floor support member and supporting an upstream end of said second transverse row of floor panels on said second floor support member.

19. The method of claim 18 further comprising the step of:
creating a gate opening in at least one of said decks by removing selected ones of said floor panels and mounting said removed floor panels on said gate support members in opposition to the remaining floor panels to direct particulate material into said gate opening.

20. The method of claim 19 wherein said mounting step utilizes floor panels having a first length, while said placing step utilizes floor panels having a second length greater than said first length.

21. The method of claim 20 wherein said forming step includes the following steps:
using an angle iron member for said front floor support member, said third floor support member and each of said gate support members, each of said front floor support member and said third support member being oriented with one leg of said angle iron member oriented parallel to a desired inclination of the corresponding said deck; and
positioning a C-channel member as said second transverse floor support member for decks having both first and second transverse rows of floor panels such that a downstream end of said first row of floor panels is supported on top of said C-channel and an upstream end of said second row of floor panels being supported internally of said C-channel to provide an overlap between said first and second rows of floor members.

22. A modular floor panel for use in forming decks of a chute apparatus directing flows of segregated particulate material from a classification device to a remote location, comprising:
a layer of liner material defining a wear surface over which particulate material passes;
at least one mounting clip supporting said layer of lining material for detachable engagement with a transverse frame member of said chute apparatus; and
a rigid backing plate having first and second opposing sides, said layer of lining material being affixed to said first side of said backing plate and said at least one mounting clip being affixed to said second side of said backing plate,
selected ones of said floor panels being formed with at least two mounting clips spaced longitudinally on said backing plate, said chute apparatus further including a pair of generally vertically spaced gate support members, said selected ones of said floor panels being selectively convertible into gate panels by being removed from said floor support members and mounted on said gate support members in opposition to said remaining floor panels and forming an opening in said deck through which particulate material may fall, said opposing gate panel directing particulate material into said opening.

23. The modular floor panel of claim 22 wherein other selected ones of said floor panels are formed with at least three longitudinally spaced mounting clips affixed to said backing plate, two of said mounting clips being spaced corresponding to said gate support members while the third said mounting clip is utilized when engaging a floor support member.

* * * * *